United States Patent
Itoh et al.

(10) Patent No.: US 8,657,301 B2
(45) Date of Patent: Feb. 25, 2014

(54) VEHICLE BODY TILTING APPARATUS

(75) Inventors: Koichi Itoh, Toyota (JP); Ippei Yamazaki, Toyota (JP); Shiro Monzaki, Mishima (JP); Yuichi Onoda, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/822,502

(22) PCT Filed: Oct. 12, 2010

(86) PCT No.: PCT/JP2010/067843
§ 371 (c)(1),
(2), (4) Date: Mar. 12, 2013

(87) PCT Pub. No.: WO2012/049724
PCT Pub. Date: Apr. 19, 2012

(65) Prior Publication Data
US 2013/0193656 A1    Aug. 1, 2013

(51) Int. Cl.
  *B60G 21/05*    (2006.01)
  *B62D 9/02*     (2006.01)

(52) U.S. Cl.
  USPC ............................... 280/5.509; 280/124.103

(58) Field of Classification Search
  USPC .................... 280/5.509, 5.508, 5.506, 6.154, 280/124.103
  See application file for complete search history.

(56) References Cited

U.S. PATENT DOCUMENTS

| | | | | |
|---|---|---|---|---|
| 3,277,840 A * | 10/1966 | Li | ................................. | 105/145 |
| 6,805,362 B1 * | 10/2004 | Melcher | ........................ | 280/5.52 |
| 7,568,541 B2 * | 8/2009 | Pfeil et al. | ...................... | 180/210 |
| 7,648,148 B1 * | 1/2010 | Mercier | ................. | 280/124.103 |
| 8,141,890 B2 * | 3/2012 | Hughes et al. | ......... | 280/124.103 |
| 8,235,398 B2 * | 8/2012 | Mercier | ........................ | 280/5.51 |
| 8,360,440 B2 * | 1/2013 | Mercier | ...................... | 280/5.509 |
| 2007/0029751 A1 | 2/2007 | Marcacci | | |
| 2008/0197597 A1 * | 8/2008 | Moulene et al. | ........ | 280/124.103 |
| 2008/0238005 A1 * | 10/2008 | James | ......................... | 280/5.509 |
| 2010/0025944 A1 | 2/2010 | Hara et al. | | |

FOREIGN PATENT DOCUMENTS

| | | |
|---|---|---|
| EP | 1 516 806 A1 | 3/2005 |
| JP | A-53-32538 | 3/1978 |
| JP | A-2005-88742 | 4/2005 |
| JP | A-2009-40381 | 2/2009 |
| JP | A-2009-184629 | 8/2009 |
| JP | A-2009-214857 | 9/2009 |
| JP | A-2010-52728 | 3/2010 |
| WO | WO 2005/058680 A1 | 6/2005 |

* cited by examiner

*Primary Examiner* — Drew Brown
(74) *Attorney, Agent, or Firm* — Oliff, PLC

(57) ABSTRACT

A vehicle body tilting apparatus includes: a right/left-wheels holding member having an elongated shape, and holding a right side wheel and a left side wheel of a vehicle which are disposed to be spaced apart from each other in a width direction of the vehicle such that each of the wheels is movable in a vertical direction; and a lean actuator disposed between the right/left-wheels holding member and a body of the vehicle, and configured to tilt at least the body of the vehicle in a lateral direction with respect to a normal line that is perpendicular to a road surface, by pivoting the right/left-wheels holding member and the body of the vehicle relative to each other. An output shaft of the lean actuator is fixed to the right/left-wheels holding member, and the body of the vehicle is fixed to a main body of the lean actuator.

11 Claims, 10 Drawing Sheets

VEHICLE BODY TILTING APPARATUS

TECHNICAL FIELD

The present invention relates to a vehicle body tilting apparatus that is configured to tilt at least a vehicle body in a lateral direction.

BACKGROUND ART

Patent Document 1 discloses a vehicle including (a) a vehicle body tilting apparatus and (b) a slide lock device capable of switching between two states, such that one of the two states is a state in which a main body of the vehicle body tilting apparatus and wheels of the vehicle are allowed to be relatively moved in a vertical direction, and such that the other of the two states is a state in which the main body of the vehicle body tilting apparatus and the wheels are inhibited from being relatively moved in the vertical direction. The vehicle body tilting apparatus includes an electric motor as a lean actuator and a screw mechanism. When an electric current is not supplied to the electric motor, the screw mechanism is locked whereby the vehicle body tilting apparatus is placed in a non-operable state. When the vehicle body tilting apparatus is operable normally, the slide lock device is placed in its lock state so that the wheels are tilted by operation of the vehicle body tilting apparatus. When the vehicle body tilting apparatus fails to be operated normally, the supply of the electric current to the electric motor is stopped and the slide lock device is placed in its unlock state. Owing to own weight of the vehicle, the main body of the vehicle body tilting apparatus and the wheels are relatively moved in the vertical direction whereby the vehicle body is brought back into a substantially level posture.

Patent Document 2 discloses a vehicle including a rotational driving device configured to rotationally drive wheels of the vehicle and a cabin-portion moving device configured to move a cabin portion of the vehicle (on which a vehicle operator rides) in a longitudinal direction of the vehicle. In this vehicle, the rotational driving device is controlled in event of failure of the cabin-portion moving device, and the cabin-portion moving device is controlled in event of failure of the rotational driving device. Owing to this control arrangement, it is possible to restrain reduction of ride comfort for the vehicle operator.

Patent Document 3 discloses a tilting apparatus that is configured to tilt a body of a vehicle by operating one of two actuators provided on respective opposite sides of a torsion bar of the vehicle. In event of failure of the above-described one of the two actuators, an angle of tilt of the vehicle body is reduced by operating the other of the two actuators.

Patent Document 4 discloses a tilt control device configured to selectively allowing and restraining tilt of a body of the vehicle that is caused due to turning of the vehicle. This tilt control device is a device utilizing a hydraulic pressure, and includes a damper.

PRIOR ART DOCUMENTS

Patent Documents

[Patent Document 1] JP-2009-214857A
[Patent Document 2] JP-2009-40381A
[Patent Document 3] JP-2009-184629A
[Patent Document 4] JP-2010-52728A

DISCLOSURE OF THE INVENTION

Object to be Achieved by the Invention

An object of the present invention is an improvement of a vehicle body tilting apparatus, for example, a reduction of a size of a lean actuator that is included in the vehicle body tilting apparatus.

Measures for Achieving the Object and Effect

A vehicle body tilting apparatus according to the present invention includes (a) a right/left-wheels holding member holding a right side wheel and a left side wheel of a vehicle such that each of the wheels is extendable in a vertical direction and (b) a lean actuator configured to tilt at least a body of the vehicle in a lateral direction with respect to a normal line that is perpendicular to a road surface, by pivoting the right/left-wheels holding member and the body of the vehicle relative to each other.

With the right/left-wheels holding member and the vehicle body being pivoted relative to each other by the lean actuator, at least the vehicle body is tilted in a lateral direction with respect to the normal line of the road surface. For example, by tilting the vehicle body in a direction toward a center of turning of the vehicle (i.e., transportation means) during the turning, a position of a center of gravity of the vehicle can be shifted more in the direction toward the center of the turning whereby a reduction of spin stabilization can be more restrained, as compared with a case without tilt of the vehicle body in the direction toward the center of the turning.

Particularly, in a vehicle having a tread that is small relative to a height of the gravity center of the vehicle body (i.e., a vertical length of the vehicle body), the reduction of the spin stabilization can satisfactorily restrained.

The right/left-wheels holding member receives, via the lean actuator, a load applied from at least a part of the vehicle body (including a frame and devices). The load applied to the right/left-wheels holding member is supported by the left side and right side wheels. Therefore, a load applied to the output shaft of the lean actuator can be reduced, so that the lean actuator can be constituted by an actuator whose output is small whereby the lean actuator can be made compact in size.

Various Modes of the Invention

There will be described various modes of the invention deemed to contain claimable features for which protection is sought. Hereinafter, the invention deemed to contain the claimable features will be referred to as "claimable invention" where appropriate. The claimable invention includes at least "the present invention" or "the invention of the present application" which is an invention described in claims, and could include also specific concept of the invention of the present application, generic concept of the invention of the present application and other concept of the invention of the present application. Each of these modes of the invention is numbered like the appended claims and depends from the other mode or modes, where appropriate, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiments of the invention. In a limit in accordance with such an interpretation, a mode of the claimable invention can be constituted by not only each one of these modes but also either a mode provided by any one of these modes and additional components incorporated therein or a mode provided by any one of these modes without some of components recited therein.

(1) A vehicle body tilting apparatus characterized by including:

a right/left-wheels holding member having an elongated shape, and holding a right side wheel and a left side wheel of a vehicle which are disposed to be spaced apart from each other in a width direction of the vehicle such that each of the wheels is movable in a vertical direction; and a lean actuator disposed between the right/left-wheels holding member and a body of the vehicle, and configured to tilt at least the body of the vehicle in a lateral direction with respect to a normal line that is perpendicular to a road surface, by pivoting the right/left-wheels holding member and the body of the vehicle relative to each other, wherein an output shaft of the lean actuator is fixed to the right/left-wheels holding member, and the body of the vehicle is fixed to a main body of the lean actuator.

The right/left-wheels holding member is a member connecting between the left side and right side wheels, so that a load applied to the right/left-wheels holding member is distributed to the left side and right side wheels. In this sense, the right/left-wheels holding member may be referred to as a right/left-wheels connecting member or a seesaw member.

The output shaft of the lean actuator is a rotary shaft, and is attached (or fixed) to the right/left-wheels holding member so as to be unrotatable relative to the right/left-wheels holding member. Further, the main body of the lean actuator is attached (or fixed) to the vehicle body so as to be unpivotable relative to the vehicle body. With rotation of the output shaft of the lean actuator, the right/left-wheels holding member and the vehicle body are pivoted relative to each other whereby the vehicle body is tilted in a lateral direction with respect to the normal line of the road surface.

It is noted that, in the vehicle body tilting apparatus described in this mode in which at least the vehicle body is tilted with respect to the normal line of the road surface, there are a case where the wheels are tilted with respect to the normal line of the road surface and also a case where the wheel are not tilted with respect to the normal line of the road surface. Further, where the wheels as well as the vehicle body are tilted, there are a case where an angle of tilt of the vehicle body with respect to the normal line of the road surface and an angle of tilt of each wheel with respect to the normal line of the road surface are equal to each other and also a case where they are different from each other. The angle of tilt of the vehicle body with respect to the normal line of the road surface is an angle defined between the normal line of the road surface and a vertical line (hereinafter referred to as a vertical direction line that defines a vertical direction of the vehicle body, where appropriate) that passes through a certain point of the vehicle body when the vehicle is on a horizontal road surface with the vehicle body being in a level attitude (i.e., being parallel with the road surface) and with the lean actuator being in its neutral position. The certain point of the vehicle body may be a center of gravity of the vehicle body, for example. Meanwhile, the angle of tilt of each wheel with respect to the normal line of the road surface is an angle defined between the normal line of the road surface and a line extending generally in a vertical direction and parallel with a rotary surface of the wheel when the vehicle is on a horizontal road surface with the vehicle body being in a level attitude and with the lean actuator being in its neutral position. There is a case where the angle of tilt of the wheel with respect to the normal line of the road surface is not 0° is when the lean actuator is in its neutral position.

(2) A vehicle body tilting apparatus characterized by including:

a right/left-wheels holding member having an elongated shape, and held at an intermediate portion thereof by a body of a vehicle such that the right/left-wheels holding member is pivotable relative to the body of the vehicle, the right/left-wheels holding member holding a right side wheel and a left side wheel of the vehicle such that each of the wheels is movable in a vertical direction; and a lean actuator configured to tilt at least the body of the vehicle with respect to a normal line that is perpendicular to a road surface, by pivoting the right/left-wheels holding member relative to the body of the vehicle, wherein the right/left-wheels holding member is fixed to an output shaft of the lean actuator, and a main body of the lean actuator is fixed to the body of the vehicle.

The lean actuator is held at its main body by the vehicle body so as to be unrotatable relative to the vehicle body, and the right/left-wheels holding member is fixed at its intermediate portion to the output shaft so as to unrotatable relative to the output shaft. Thus, the right/left-wheels holding member is held by the vehicle body through the lean actuator.

(3) The left side wheel and the right side wheel may be held by the above-described right/left-wheels holding member through respective struts.

Each of the struts may be adapted to include a shock absorber and a spring that are disposed in parallel with each other or adapted to include a shock absorber.

Further, in the vehicle body tilting apparatus described in this mode, since each of the struts and the lean actuator are disposed in series with each other, it is possible to enable a suspension and the lean actuator to be operated independently of each other.

It is noted that, since each of the left side and right side wheels is connected to the vehicle body through a corresponding one of the struts and the right/left-wheels holding member, it is possible to interpret that an upper arm is constituted by each of the struts and each of arm portions of the right/left-wheels holding member. Each arm portion is a portion that extends between an engaged portion and a pivot center portion of the right/left-wheels holding member, wherein the engaged portion is a portion at which the right/left-wheels holding member is engaged with the corresponding wheel, and wherein the pivot center portion is a portion to which the output shaft of the lean actuator is fixed, namely, at which the right/left-wheels holding member is held by the vehicle body so as to be pivotable relative to the vehicle body.

(4) The left side wheel and the right side wheel are held by the body of the vehicle through respective leading arms.

Each of the left side and right side wheels is rockably held by the vehicle body through the leading arm as a lower arm, so that it is possible to provide a space between the left side and right side wheels. For example, a footrest and/or a pedal operating device can be disposed in the space. It is noted that each of the left side and right side wheels may be held by the vehicle body through a trailing arm in place of the leading arm, as long as it is permitted depending on a shape of the vehicle body. In this case, too, it is possible to provide a space between the left side and right side wheels.

Further, each of the left side and right side wheels is connected to the vehicle body through the corresponding strut and the corresponding arm portion of the right/left-wheels holding member, and is connected to the vehicle body through the corresponding leading arm. An attitude of each of the left side and right side wheels such as its camber angle is determined depending on the corresponding strut, the corresponding arm portion (i.e., upper arm) of the right/left-wheels holding member, the corresponding leading arm (i.e., lower arm) and an attitude of the vehicle body. Since the suspension geometry is known, it is possible to consider that the attitude of each wheel such as its camber angle, after the wheel has been tilted, is determined depending on a rotational angle of the output shaft of the lean actuator, i.e., the lean angle of the vehicle body.

(5) The above-described right/left-wheels holding member may be a right/left-wheels holding bar that extends straight in the width direction of the vehicle.

(6) The above-described right/left-wheels holding member has a shape that is curved as seen from a front side of the vehicle, the right/left-wheels holding member including engaged portions at which the right/left-wheels holding member is engaged with the above-described struts for the left side wheel and the right side wheel, the right/left-wheels holding member including a fixed portion at which the right/left-wheels holding member is fixed to the output shaft of the lean actuator, wherein the right/left-wheels holding member may be provided to take an attitude that causes the engaged portions to be positioned on an upper side of the fixed portion when the right/left-wheels holding member is in a neutral pivot position relative to the body of the vehicle.

The right/left-wheels holding member, which has an elongated shape extending in the width direction of the vehicle, may have either a straight linear shape or a curved shape. The curved shape may be, for example, a V shape or U shape. The right/left-wheels holding member is an integrally formed member which is, commonly, constituted by a rigid body.

There will be described a right/left-wheels holding member (hereinafter referred to as a straight-linear-shaped bar) having a straight linear shape and a right/left-wheels holding member (hereinafter referred to as a V-shaped bar) having a V shape, in comparison with each other.

It is common that a distance between the engaged portions for the respective left side and right side wheels is the same where the V-shaped bar is employed as where the straight-linear-shaped bar is employed, as long as the tread between the wheels is not changed.

However, since the length of the V-shaped bar is larger than the length of the straight-linear-shaped bar, a radius of pivot is larger where the V-shaped bar is employed than where the straight-linear-shaped bar is employed. Therefore, as long as the angle of pivot of the right/left-wheels holding member relative to the vehicle body by the lean actuator is the same, namely, as long as the angle of tilt of the vehicle body with respect to the normal line of the road surface is the same, a vertical displacement of each of the engaged portions for the left side and right side wheels is smaller where the V-shaped bar is employed than where the straight-linear-shaped bar is employed. Consequently, where the V-shaped bar is employed, it is possible to reduce an amount of change of the vehicle height (i.e., an amount of change of the center of gravity of the vehicle) and accordingly to restrain reduction of ride comfort for a vehicle operator when the vehicle body is tilted in a direction toward a center of turning of the vehicle during the turning of the vehicle.

Further, the engaged portions for the respective left side and right side wheels are displaced in a lateral direction by a smaller amount where the V-shaped bar is employed than where the straight-linear-shaped bar is employed. Therefore, an amount of change of the camber angle of each wheel upon tilt of the vehicle body in the direction toward the center of turning is smaller where the V-shaped bar is employed than where the straight-linear-shaped bar is employed. That is, the camber angle can be made smaller where the V-shaped bar is employed than where the straight-linear-shaped bar is employed, as long as the angle of tilt of the vehicle body with respect to the normal line of the road surface is the same. Thus, with employment of the V-shaped bar, it is possible to avoid an excessive increase of the camber angle and to make the camber angle be a suitable degree.

(7) The vehicle body tilting apparatus may be adapted to include a lean actuator control device configured to control the above-described lean actuator.

The lean actuator may be controlled, for example, such that the vehicle body is tilted in a direction toward a center of turning of the vehicle during the turning of the vehicle. Further, the lean actuator may be controlled such that a load applied to the left side wheel and a load applied to the right side wheel are substantially equal to each other. During the turning of the vehicle, for example, a resultant force composed of a centrifugal force and a gravity force acts on the vehicle body, and at least a part of the resultant force is applied to the right/left-wheels holding member. The at least part of the resultant force applied to the right/left-wheels holding member can be distributed equally to the left side and right side wheels.

Further, it is possible to control the lean actuator in such a manner that causes the resultant force to act along a line that intersects with a road surface within a predetermined range between the left side and right side wheels as seen from a front side of the vehicle. In this case, a load applied to the left side wheel and a load applied to the right side wheel are not necessarily the same to each other. The lean actuator may be controlled, for example, such that the line of action of the resultant force intersects with the road surface within a rage that is defined by cooperation of lines interconnecting contact points at which wheels (i.e., three or more wheels) of the vehicle are in contact with the road surface.

(8) The above-described lean actuator may be adapted to include an electric motor and a speed reducer.

Although the provision of the speed reducer is not essential, the provision of the speed reducer leads to an increase in degree of freedom in designing the electric motor. The electric motor may be referred to as a lean motor.

(9) The vehicle body tilting apparatus may be adapted to include a lean lock device that is configured, when the above-described lean actuator fails to be operated normally, to lock the lean actuator in a neutral position thereof.

The case when the lean actuator fails to be operated normally refers to (a) a case when the lean actuator suffers from a failure, for example, due to malfunction or disconnection of the electric motor included in the lean actuator, (b) a case when an electric system (such as an electric power source supplying an electric current to the lean actuator) suffers from a failure, and (c) a case when a control system (such as ECU controlling the lean actuator and a sensor or the like used for the control) suffers from a failure.

When the lean actuator is placed in its neutral position, each of the left side and right side wheels is placed in a neutral position relative to the vehicle body, namely, the right/left-wheels holding member is placed in a neutral position relative to the vehicle body. The state in which each of the left side and right side wheels is placed in the neutral position relative to the vehicle body refers to a state in which the vehicle body is not tilted with respect to the normal line of the road surface, so that a vertical direction line defining the vertical direction of the vehicle body is parallel to the normal line of the road surface (namely, the vehicle body is in a level attitude, or the right/left-wheels holding member extends horizontally)

when the vehicle is on a horizontal road surface. In this state, the angle of pivot of the right/left-wheels holding member relative to the vehicle body is zero, and the lean actuator is placed in the neutral position. Further, when the lean actuator is placed in the neutral position, the output shaft is also placed in its neutral position, i.e., an angularly central position. The output shaft is to be rotated from its angularly central position in either of opposite directions, so that the vehicle body is tilted in a leftward direction when the output shaft is rotated in a corresponding one of the opposite directions, and so that the vehicle body is tilted in a rightward direction when the output shaft is rotated in the other of the opposite directions.

(10) The above-described output shaft is rotatable by an angle not larger than 180° in either of opposite directions from an angularly central position thereof corresponding to the above-described neutral position, wherein the above-described lean lock device may be adapted to include a rotation locking portion that is configured to lock the output shaft in the angularly central position corresponding to the neutral position.

The lean lock device is provided for the output shaft, i.e., a shaft that is pivotable integrally with the right/left-wheels holding member. The output shaft is not rotatable by one or more revolution, and is locked in the angularly central position. The angle, by which the output shaft is rotatable in either of the opposite directions from the angularly central position, may be, for example, not larger than 150°, not larger than 120° or not larger than 90°.

(11) The above-described lean lock device may be adapted to include a stopper that is configured to limit rotation of the output shaft.

It is possible to employ an arrangement in which the output shaft is inhibited, by the electric motor or speed reducer, from being rotated by one or more revolution. However, in the vehicle body tilting apparatus described in this mode, the output shaft is inhibited by utilizing the stopper, from being rotated by one or more revolution.

(12) The above-described lean lock device may be adapted to include (a) at least one locking member that is movable between a retracted position and a working positions thereof, (b) a biasing member that biases the at least one locking member toward the working position, and (c) a lean lock actuator which is configured to cause the at least one locking member to be held in the retracted position against a biasing force of the biasing member when the above-described lean actuator is operable normally, and which is configured to allow the at least one locking member to be moved toward the working position when the lean actuator fails to be operated normally.

The locking member is held such that the locking member is movable in a direction (i.e., radial direction) that intersects with a rotational direction of the output shaft. When the locking member is positioned in the working position, the locking member is in engagement with the output shaft so as to inhibit rotation of the output shaft.

Further, the rotational angle of the output shaft can be limited by cooperation of the locking member and the stopper, whereby the output shaft can be early returned to the angularly central position.

(13) The above-described output shaft has a large radius portion and a small radius portion which have respective different radii and which are arranged in a circumferential direction of the output shaft, wherein the above-described lean lock device includes two locking members, such that the two locking members are movably held in respective positions that are located in respective opposite sides of the large radius portion in the circumferential direction when the output shaft is in the angularly central position corresponding to the neutral position.

(14) The above-described two locking members are spaced apart from each other in the circumferential direction of the above-described output shaft, wherein (i) each of the two locking members is movable to the working position, when the output shaft is in the angularly central position corresponding to the neutral position, and wherein (ii) one of the two locking members is movable to the working position while the other of the two locking members is held in a position that causes the other of the two locking members to be inhibited, by the above-described large radius portion of the output shaft, from being moved to the working position, when the output shaft is not in the angularly central position corresponding to the neutral position.

(15) The above-described output shaft has a recess that is provided in an outer peripheral portion thereof, wherein the above-described lean lock device includes a locking member, and wherein the locking member is movably held in a position that enables the locking member to be fitted into the recess when the output shaft is in the angularly central position corresponding to the neutral position.

The number of the locking member may be one, two or more. The output member is locked by engagement of the locking member or members with the output shaft.

In an arrangement in which two locking members are provided in the lean lock device, the two locking members are held in positions that are located on respective opposite sides of the large radius portion of the output shaft when the output shaft is positioned in the angularly central position. Owing to the provision of the locking members on the respective opposite sides of the large radius portion of the output shaft, it is possible to satisfactorily inhibit rotation of the output shaft.

Further, in the arrangement in which the two locking members are provided, the rotation of the output shaft can be inhibited more reliably, than an arrangement in which one locking member is provided. For example, even when the output shaft is not positioned in the angularly central position, one of the two locking members can be moved to the working position. The output shaft is inhibited, by this one of the two locking members, from being rotated in a corresponding direction, whereby the output shaft can be inhibited from being rotated to pass the angularly central position toward an opposite side. Further, with contact of the one of the two locking members with the output shaft, the output shaft can be positioned in the angularly central position (or can be stopped in the angularly central position), whereby the other of the two locking members can be moved to the working position, so that the output shaft can be locked in the angularly central position.

In the arrangement in which one locking member is provided, there is an advantage that the number of the components can be reduced, as compared with the arrangement in which two locking members are provided. It is preferable that the arrangement in which one locking member is provided, is employed in combination with a lean actuator in which the output shaft is adapted, in event of failure, to be returned slowly to the angularly central position.

(16) The above-described lean lock actuator may be adapted to include a solenoid that is configured to give a driving force to the above-described locking member.

It is possible to employ an arrangement in which the locking member is held in the retracted position when the solenoid is energized, and is allowed to be moved to the working position when the solenoid is de-energized. Owing to this arrangement, in event of failure of the electric system, the locking member can be allowed to be moved to the working position by de-energization of the solenoid. That is, when the lean actuator can not be operated normally due to the failure of the electric system, it is possible to move the locking member to the working position and accordingly to lock the lean actuator.

It is noted that the lean actuator may be adapted to include a cylinder.

(17) The above-described lean lock actuator may be adapted to include a plurality of coils which are provided for a single locking member and which are arranged in parallel with each other.

(18) The above-described plurality of coils are connected to respective electric power sources that are other than each other.

In an arrangement in which a plurality of coils are disposed in parallel with each other, even when one of the coils suffers from a failure such as a wire disconnection, or even when one of the coils fails to receive an electric current due to a failure occurring in a corresponding one of a plurality of electric power sources, it is possible to hold the locking member in the retracted position by energization of the other of the coils. By this arrangement, it is possible to avoid the lean actuator from being undesirably locked by movement the locking member to the working position due to a failure of the lean lock device although the lean actuator is operable normally.

Thus, the provision of a plurality of coils and electric power sources can increase reliability of the lean lock device.

(19) A vehicle body tilting apparatus characterized by including:

a lean actuator disposed between a body of a vehicle and right side and left side wheels of the vehicle which are disposed to be spaced apart from each other in a width direction of the vehicle, the lean actuator being configured to tilt at least the body of the vehicle in a lateral direction with respect to a normal line that is perpendicular to a road surface; and a lean lock device that is configured, when the lean actuator fails to be operated normally, to lock the lean actuator in a state in which the body of the vehicle is positioned in a neutral position relative to the right side and left side wheels.

The lean lock device does not have be used necessarily in combination with the above-described lean actuator, but may be used in combination with a lean actuator having other construction. Further, it is preferable that the lean lock device is applied in an arrangement in which the vehicle body is tilted in a lateral direction with respect to the road surface by rotation of the output shaft of the lean actuator. It is noted that the technical features described in any one of the above modes can be employed in the lean lock device described in this mode.

MODES FOR CARRYING OUT THE INVENTION

Hereinafter, a vehicle body tilting apparatus as an embodied form of the present invention will be described.

Figure 2:
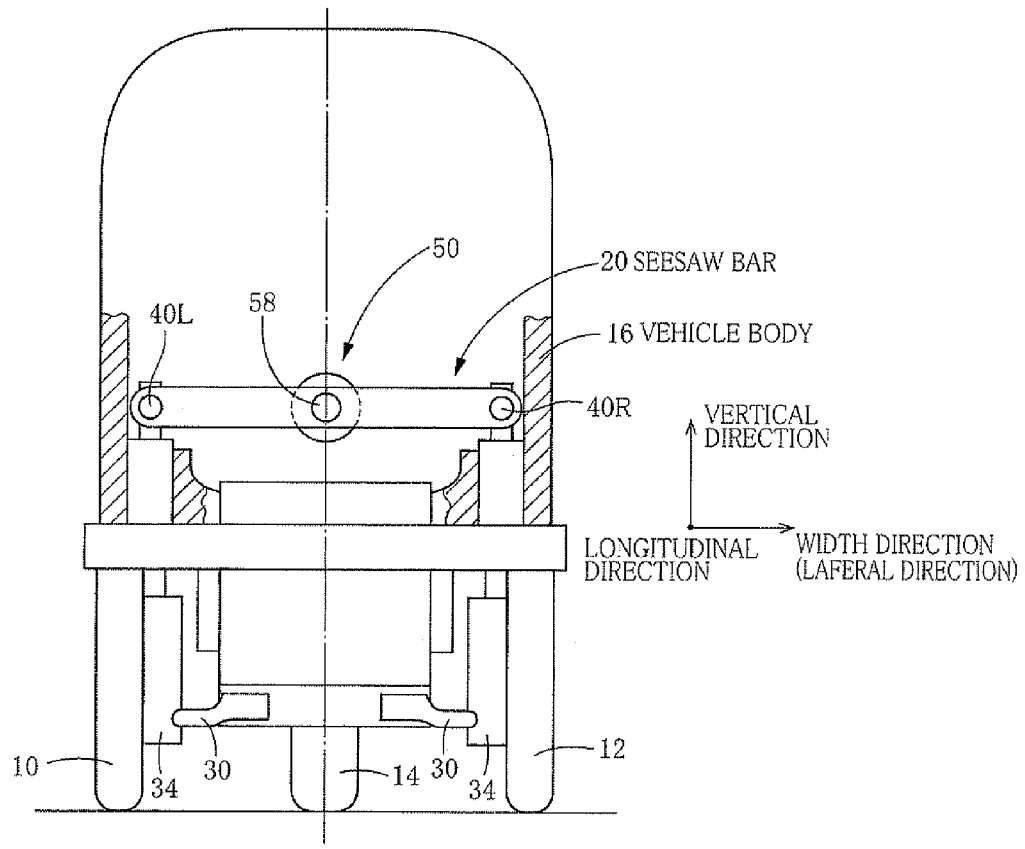
FIG. 2 is a front view (partially in cross section) of a transportation means including the vehicle body tilting apparatus according to the above-described embodiment.

The vehicle body tilting apparatus is installed on a transportation means as a vehicle, which is shown in FIG. 2. The transportation means includes front left and right wheels 10, 12 and a single rear wheel 14. The vehicle body tilting apparatus is disposed between a vehicle body 16 and the front left and right wheels 10, 12.

It is noted that the vehicle body tilting apparatus may be installed on a transportation means including four wheels consisting of front left and right wheels and rear left and right wheels or a transportation means including three wheels consisting of a single front wheel and rear left and right wheels. It is further noted that the vehicle body tilting apparatus may be disposed between a vehicle body and rear left and right wheels.

Embodiment 1

Seesaw Bar

Figure 1:
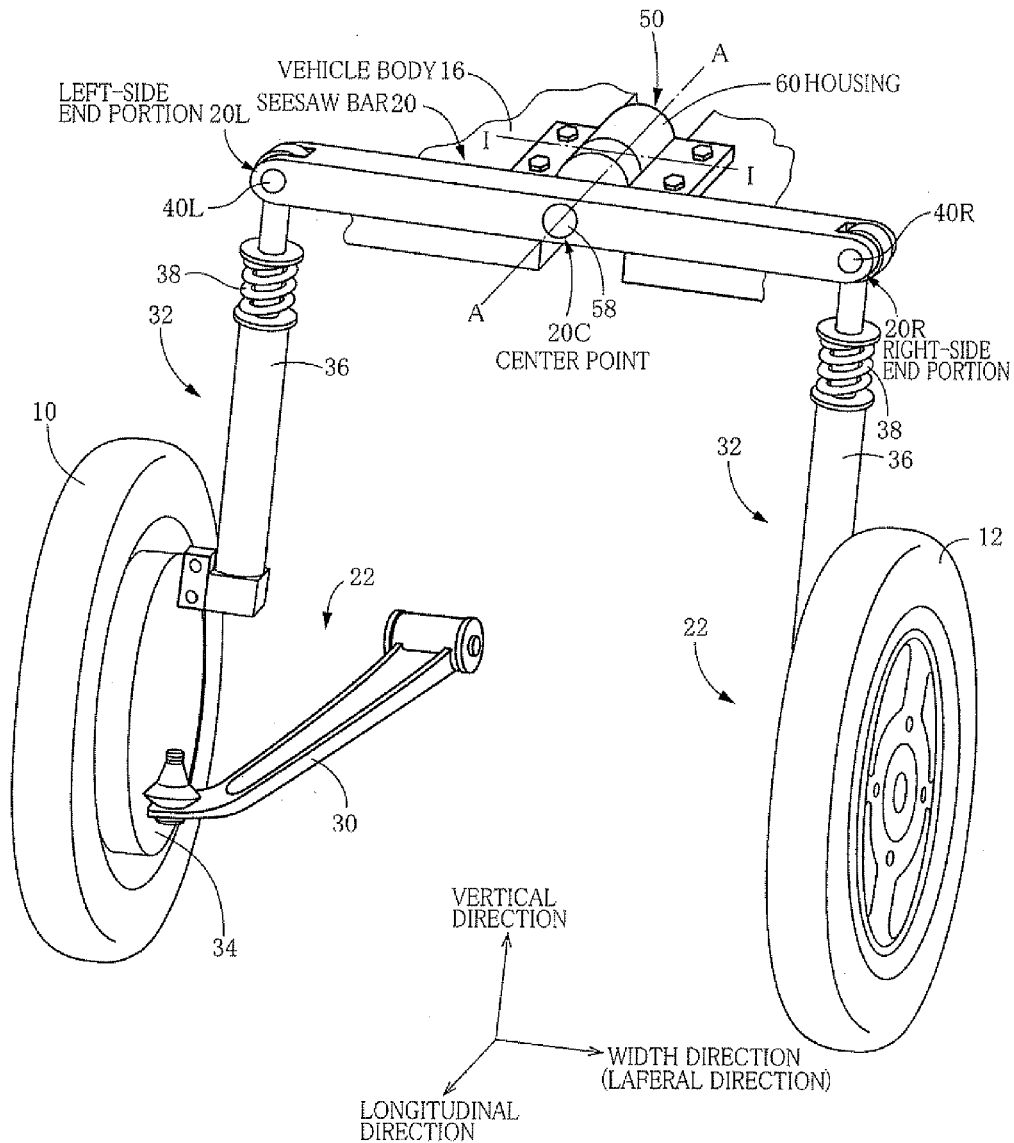
FIG. 1 is a view schematically showing an entirety of a vehicle body tilting apparatus according to Embodiment 1 of the present invention.

As shown in FIG. 1, the vehicle body tilting apparatus includes a seesaw bar 20 as a right/left-wheels holding member. The seesaw bar 20 is an integrally formed member which has an elongated shape and which is, in most cases, constituted by a rigid body. The seesaw bar 20 extends in a lateral direction (i.e., width direction) of the transportation means, and is held at its intermediate portion (i.e., a center point in its longitudinal direction in the present embodiment) 20C by a vehicle body 16, such that the seesaw bar 20 is pivotable relative to the vehicle body 16. Front left and right wheels 10, 12 of the vehicle are held by respective left-side and right-side end portions 20L, 20R of the seesaw bar 20, such that each of the front left and right wheels 10, 12 is extendable.

Each of the front left and right wheels 10, 12 is held by the vehicle body 16 through respective suspensions 22 each of which includes a leading arm 30 as a lower arm and a strut 32. The leading arm 30 is connected to a lower portion of a wheel holding portion 34. Each of the front left and right wheels 10, 12 is rotatably held by the wheel holding portion 34. The strut 32 is connected to an upper portion of the wheel holding portion 34. Thus, the leading arm 30 and the strut 32 are connected to the respective portions of the wheel holding portion 34, which are spaced apart from each other.

Figure 3:
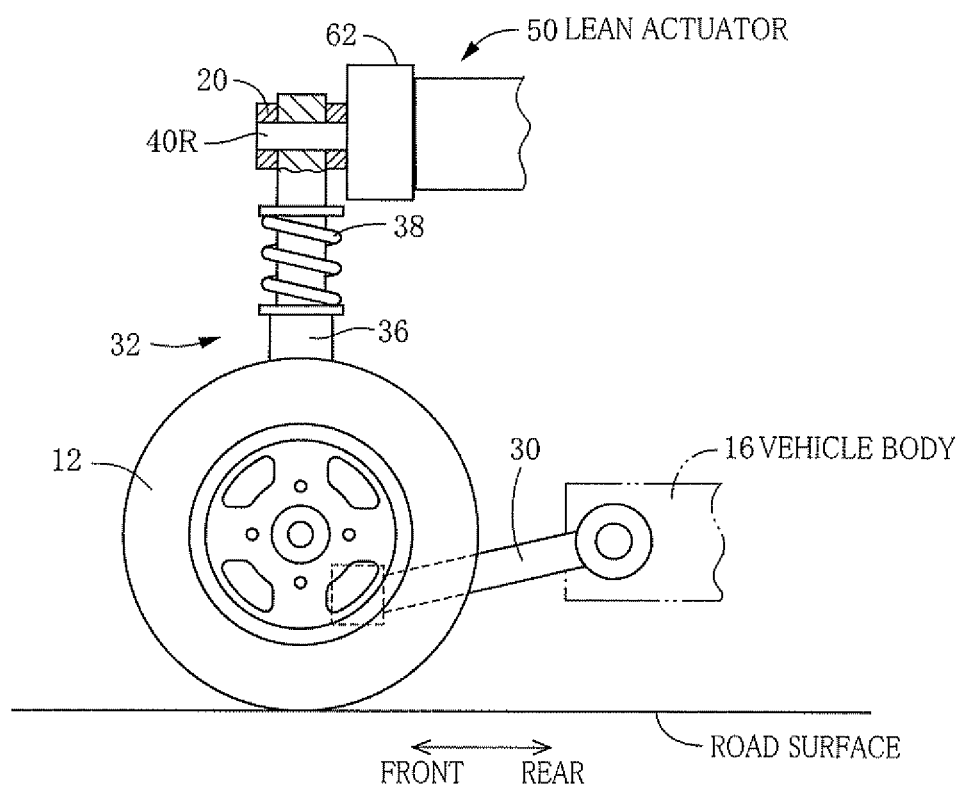
FIG. 3 is a view schematically showing a suspension of the above-described transportation means.

As shown in FIG. 3, the leading arm 30 is connected at an end portion thereof to the wheel holding portion 34 through a ball joint, such that the leading arm 30 is pivotable relative to the wheel holding portion 34. Further, the leading arm 30 is connected at another end portion thereof to the vehicle body 16, such that the leading arm 30 is rockable about an axis that extends in the lateral direction. The strut 32 includes a shock absorber 36 and a spring 38 that are disposed in parallel with each other, and is connected at an end portion thereof to the wheel holding portion 34. Further, the strut 32 is connected at another end portion thereof to a corresponding one of the opposite end portions 20L, 20R of the seesaw bar 20 through a corresponding one of pins 40L, 40R, such that the strut 32 is pivotable relative to the seesaw bar 20 about an axis that extends in a longitudinal direction of the transportation means. Thus, the strut 32 is held by the vehicle body 16 through the seesaw bar 20. It is possible to interpret that the strut 32 cooperates with an arm (i.e., a corresponding one of a portion extending between the left-side end portion 20L and the center point 20C and a portion extending between the right-side end portion 20R and the center point 20C) to constitute an upper arm.

In the present embodiment in which the lower arm is constituted by the leading arm 30, it is possible to obtain a space defined between the front left and right wheels 10, 12. Therefore, for example, a pedal operating device or the like of the transportation means can be easily installed.

<Lean Actuator>

The vehicle body tilting apparatus includes a lean actuator 50 that is disposed between the seesaw bar 20 and the vehicle body 16.

Figure 4:
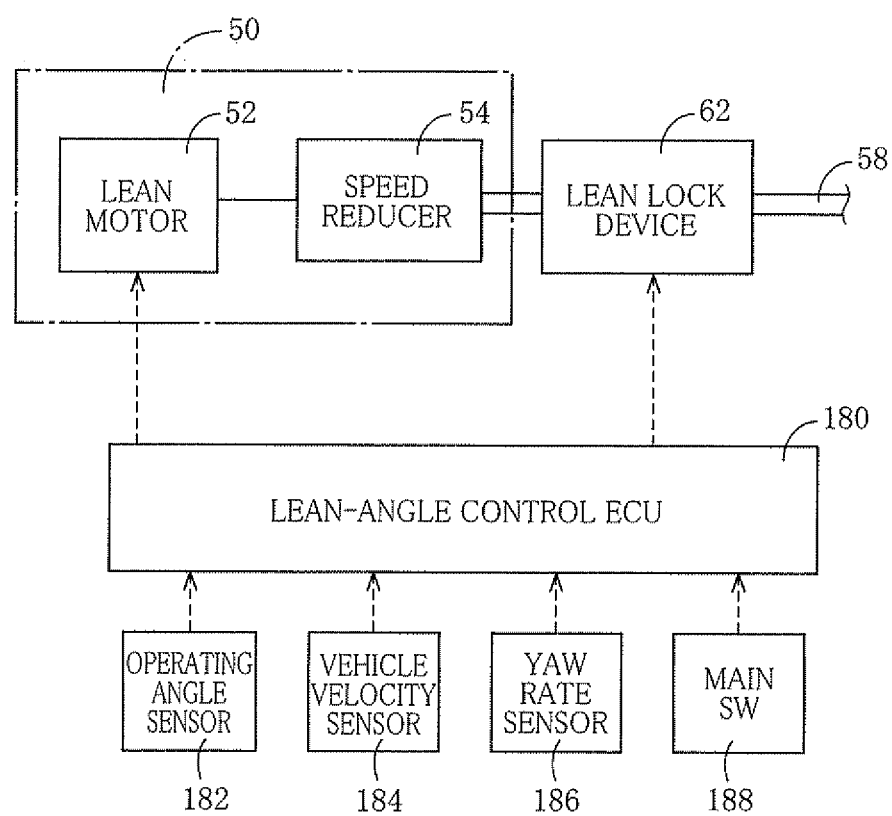
FIG. 4 is a view schematically showing a lean actuator included in the above-described vehicle body tilting apparatus.

As shown in FIG. 4, the lean actuator 50 includes a lean motor 52 as an electric motor and a speed reducer 54. The lean actuator 50 has an output shaft 58 in the form of a rotary shaft that is held inside a housing 60 (see FIG. 1) such that the rotary shaft is rotatable relative to the housing 60. In the lean actuator 50, a rotational speed of the output shaft of the electric motor 52 is reduced by the speed reducer 54, and is then outputted through the output shaft 58 that is fixed to the seesaw bar 20 (unrotatably relative to the seesaw bar 20). The output shaft 58 of the lean actuator 50 extends in parallel with an axis A that extends in the longitudinal direction of the transportation means. The housing 60 also extends in parallel with the axis A, and is fixed to the vehicle body 16 (unrotatably relative to the vehicle body 16) as shown in FIG. 1.

Therefore, by rotation of the output shaft 58 of the lean actuator 50, the seesaw bar 20 and the vehicle body 16 are pivoted, relative to each other, about the axis A that extends in the longitudinal direction.

<Lean Lock Device>

The vehicle body tilting apparatus includes a lean lock device 62 that is configured to lock the rotation of the output shaft 58 of the lean actuator 50.

Figure 5:
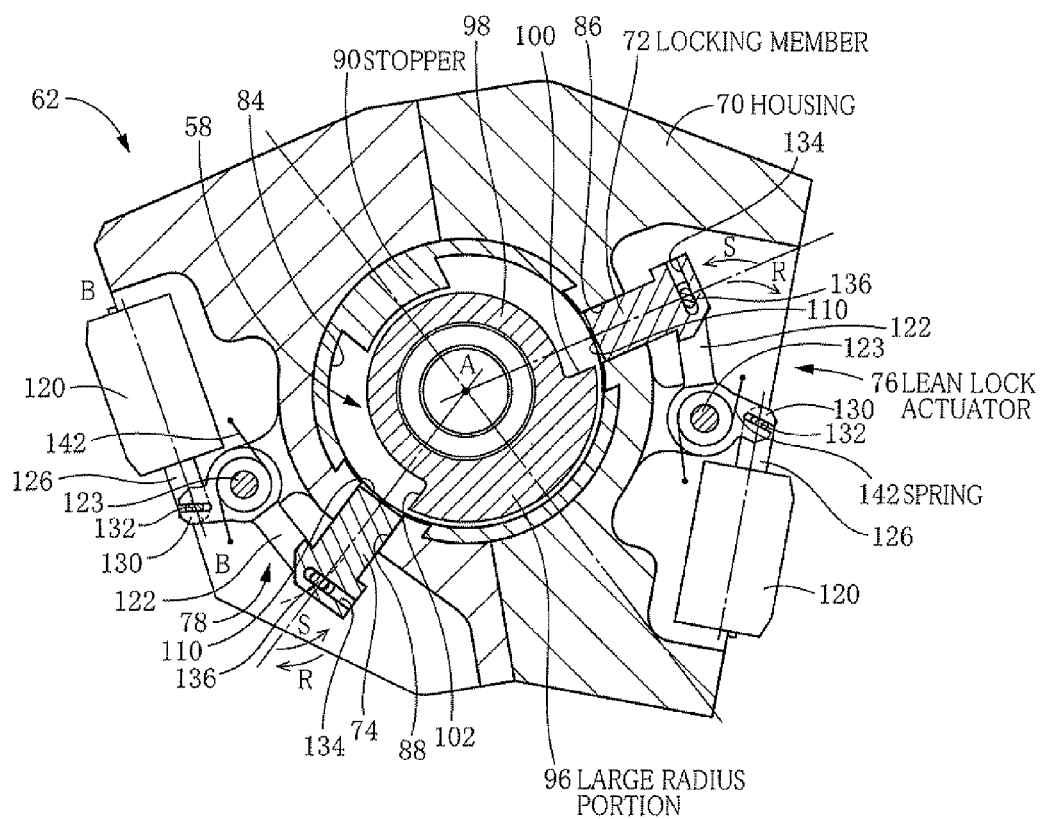
FIG. 5 is a cross sectional view of a lean lock device included in the above-described vehicle body tilting apparatus.

As shown in FIG. 5, the lean lock device 62 includes (1) a housing 70, (2) two locking members 72, 74 held by the housing 70, movably relative to the housing 70, and (3) lean lock actuators 76, 78 that are configured to drive the respective locking members 72, 74.

[Housing and other components]

For example, the housing 70 may be fixedly (i.e., relatively unmovably) provided in the housing 60, or may be constituted by an element that constitutes also the housing 60. Further, the housing 70 may be constituted by a plurality of members.

The housing 70 has a through-hole 84 that is formed to extend in a direction of the axis A. The output shaft 58 of the lean actuator 50 is disposed in the through-hole 84. Locking-member engagement holes 86, 88 are provided in the housing 70, and communicates with the through-hole 84. The locking-member engagement holes 86, 88 are formed in respective portions of the housing 70 which are spaced apart from each other in a circumferential direction of the through-hole 84, and extend in respective radial directions (i.e., directions intersecting with a rotational direction of the output shaft 58). The locking members 72, 74 are slidably fitted in the respective locking-member engagement holes 86, 88. Further, the housing 70 includes a stopper 90 that is configured to limit the rotation of the output shaft 58. The stopper 90 is constituted by a radially protruding portion that protrudes inwardly in a radial direction of the through-hole 84.

Meanwhile, the output shaft 58 of the lean actuator 50 has a cross sectional shape as shown in FIG. 5, and includes a large radius portion 96 and a small radius portion 98 having respective radii that are different from each other. When the output shaft 58 is in its angularly central position, the large radius portion 96 is positioned in a position that is opposite to the stopper 90, namely, a center of the large radius portion 96 in a circumferential direction and a center of the stopper 90 in the circumferential direction are spaced apart from each other by 180° at a central angle. Thus, the output shaft 58 is disposed with its attitude that allows the output shaft 58 to be rotated from the angularly central position by a maximized degree. It is noted that the output shaft 58 is positioned in the angularly central position when the lean actuator 50 is in its neutral position.

The above-described radially protruding portion, which serves as the stopper 90, has a radially inner end that is located between an outer periphery of the small radius portion 98 and an outer periphery of the large radius portion 96 in the radial direction of the through-hole 84, so that circumferentially opposite side surfaces of the stopper 90 can be brought into contact with respective (opposite) shoulder surfaces 100, 102 that are defined between the large radius portion 96 and the small radius portion 98. With contact of the shoulder surfaces 100, 102 with the stopper 90, the rotation of the output shaft 58 is limited. In the present embodiment, the output shaft 58 is not rotatable by one or more than one revolution. In other words, the output shaft 58 is rotatable from its angularly central position by 180° or less. In the present embodiment, the output shaft 58 is rotatable from its angularly central position by 100° or less.

It is noted that, when the output shaft 58 is positioned in the angularly central position, a lean angle, i.e., an angle of tilt of the vehicle body 16 with respect to a normal line perpendicular to the road surface is zero. Thus, the seesaw bar 20 and the vehicle body 16 are both in level postures when the transportation means is stopped or running straight on a horizontal road surface. As shown in FIG. 7(a), when the output shaft 58 is positioned in the angularly central position, a vertical line passing through a point (e.g., center of gravity) on the vehicle body (hereinafter referred to as a vertical direction line that defines a vertical direction of the vehicle body) is in parallel with the normal line of the road surface. This position corresponds to a neutral position of the seesaw bar 20 and the vehicle body 16, i.e., a neutral position of the vehicle body 16 and the left side and right side wheels 10, 12. Thus, the angularly central position of the output shaft 58, the neutral position of the lean actuator 50, the neutral position of the seesaw bar 20 relative to the vehicle body 16 and the neutral position of the vehicle body 16 relative to the wheels 10, 12 correspond to one another.

[Locking Member]

Each of the locking members 72, 74 has an elongated shape, and is held to take an attitude extending in a radial direction of the output shaft 58 (i.e., extending in a direction interesting with the rotational direction). Each of the locking members 72, 74 is relatively movable between a retracted position and a working position. When each of the locking members 72, 74 is positioned in the retracted position, its distal end surface 110 is located outside a circumferential surface of the through-hole 84. When each of the locking members 72, 74 is positioned in the working position, its distal end surface 110 is located inside the through-hole 84, more specifically, between outer circumferential surfaces of the respective large and small radius portions 96, 98 of the output shaft 58.

The locking members 72, 74 are held in respective positions in the circumferential direction (i) such that, when the output shaft 58 is in the angularly central position, the locking members 72, 74 are movable to the respective working positions (namely, the locking members 72, 74 are engageable with respective circumferentially opposite sides of the large radius portion 96 of the output shaft 58), and (ii) such that, when the output shaft 58 is not in the angularly central position, one of the locking members 72, 74 is movable to the working position while the other of the locking members 72, 74 is opposed to the outer circumferential surface of the large radius portion 96 of the output shaft 58 so as to be inhibited from being moved to the working position. In other words, when the output shaft 58 is deviated from the angularly central position, one of the two locking-member engagement holes 86, 88 is open while the other of the two locking-member engagement holes 86, 88 is closed.

[Lean Lock Actuator]

Since the lean lock actuators 76, 78 are identical in construction with each other, the lean lock actuator 76 will be described while description of the lean lock actuator 78 will be omitted. The same reference signs as used in the lean lock actuator 76 will be used to identify the corresponding elements of the lean lock actuator 78. Each of the lean lock actuators 76, 78 may be referred to as a rotation locking portion, because it is configured to lock rotation of the output shaft 58.

The lean lock actuator 76 includes (a) a solenoid 120 and (b) a driving-force transmitting member 122 that is configured to transmit a driving force of the solenoid 120 to the locking member 72.

The driving-force transmitting member 122 has a generally L shape, and is held at its intermediate bent portion by the housing 70 through a pin 123, pivotably about an axis that is parallel with the above-described axis A. Further, the driving-force transmitting member 122 is engaged at an end portion thereof with an output rod 126 of the solenoid 120, and is engaged at another end portion thereof with the locking member 72. Thus, the driving-force transmitting member 122 is held pivotably about its intermediate bent portion, while the output rod 126 and the locking member 72 are linearly movably held, so that the driving-force transmitting member 122 is engaged with the output rod 126 and the locking member 72 with a state which allows relative movements of the output rod 126 and the locking member 72 and which enables transmission of force between the output rod 126 and the locking member 72. Specifically described, the engagement of the above-described end portion of the driving-force transmitting member 122 with the output rod 126 is made by an arrangement in which a protruding portion 132 of the output rod 126 is gripped, from opposite sides of a direction intersecting with an axis B of the output rod 126, by a gripping portion 130 which is provided in a distal end portion of the driving-force transmitting member 122 and which is constituted by a pair of mutually opposed members. Owing to this arrangement, the protruding portion 132 and the driving-force transmitting member 122 are allowed to be relatively moved in a direction intersecting with the axis B, and transmission of force between the output rod 126 and the driving-force transmitting member 122 is enabled. Further, the engagement of the above-described another end portion of the driving-force transmitting member 122 with the locking member 72 is made by an arrangement in which a pin 136 provided in another distal end portion of the force transmitting member 122 is engaged in an elongated hole 134 provided in a rear end portion of the locking member 72. The elongated hole 134 is formed to extend in a direction intersecting with a direction of movement of the locking member 72. The pin 136, which is engaged in the elongated hole 134, is movable relative to the elongated hole 134. The pin 136 cooperates with lateral side walls of the elongated hole 134 to enable transmission of force between the driving-force transmitting member 122 and the locking member 72.

Further, a spring 142 is provided between the housing 70 and the intermediate bent portion of the driving-force transmitting member 122, such that the driving-force transmitting member 122 is biased in a direction (i.e., direction that causes the locking member 72 to be moved in a forward direction) that is indicated by arrow S.

When the solenoid 120 is energized, the output rod 126 is retracted. In this instance, the driving-force transmitting member 122 is pivoted about the pin 123 in a direction indicated by arrow R, against a biasing force of the spring 124, whereby the locking member 72 is moved to the retracted position. The distal end surface 110 of the locking member 72 is located outside the through-hole 84, whereby rotation of the output shaft 58 is allowed.

When the solenoid 120 is de-energized, generation of the force forcing the locking member 72 in a direction toward the retracted position (i.e., direction of arrow R) is stopped. In this instance, owing to the biasing force of the spring 142, the driving-force transmitting member 122 is allowed to be pivoted in the direction of arrow S whereby the locking member 72 is allowed to be moved to the working position.

<ECU>

As shown in FIG. 4, the vehicle body tilting apparatus is provided with a lean-angle control ECU 180 which is constituted mainly by a computer and which includes an input/output portion, a memory portion and an executing portion. To the input/output portion, there are connected, for example, an operating angle sensor 182, a vehicle velocity sensor 184, a yaw rate sensor 186 and a main switch 188 of the transportation means. The operating angle sensor 182 is provided to detect an operating amount $\phi$ of a steering member (not shown). The vehicle velocity sensor 184 is provided to detect a running velocity V of the transportation means. The yaw rate sensor 186 is provided to detect a yaw rate $\gamma$. Further, to the input/output portion, there are also connected, for example, the above-described lean motor 52 and solenoid 120 of the lean lock device 62 via drive circuits (not shown).

<Operation of Vehicle Body Tilting Apparatus>

Figure 6:
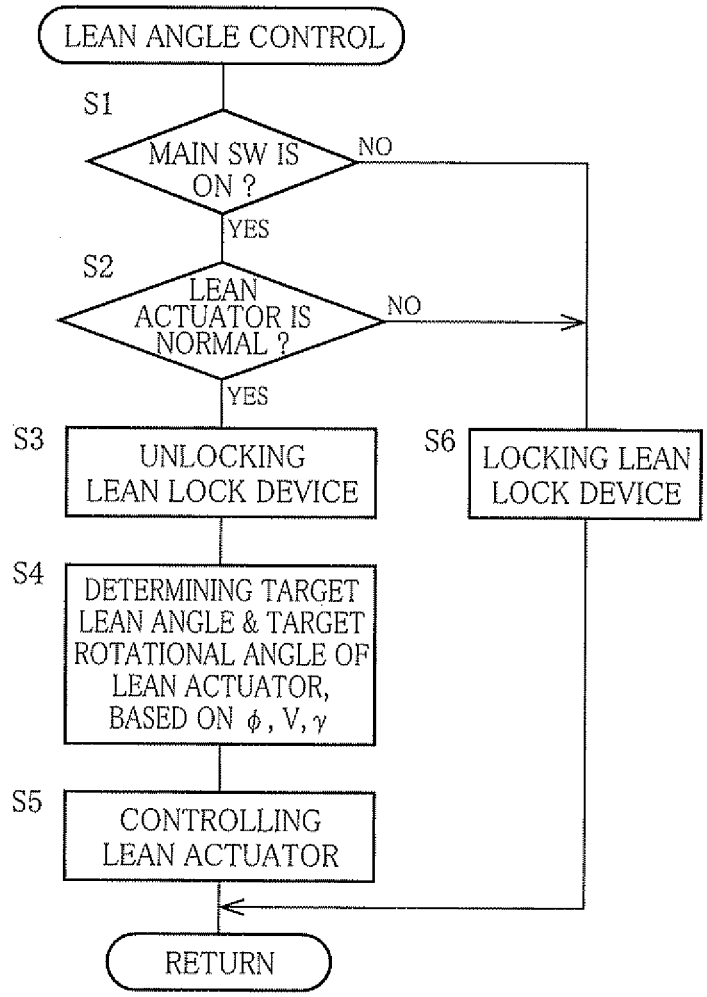
FIG. 6 is a flow chart representing a lean angle control program that is stored in a memory portion of a lean-angle ECU.

In the present embodiment, during turning of the transportation means, the vehicle body 16 is tilted in a direction toward a center of the turning. FIG. 6 is a flow chart representing a lean angle control program that is executed at a predetermined time interval.

Figure 8:
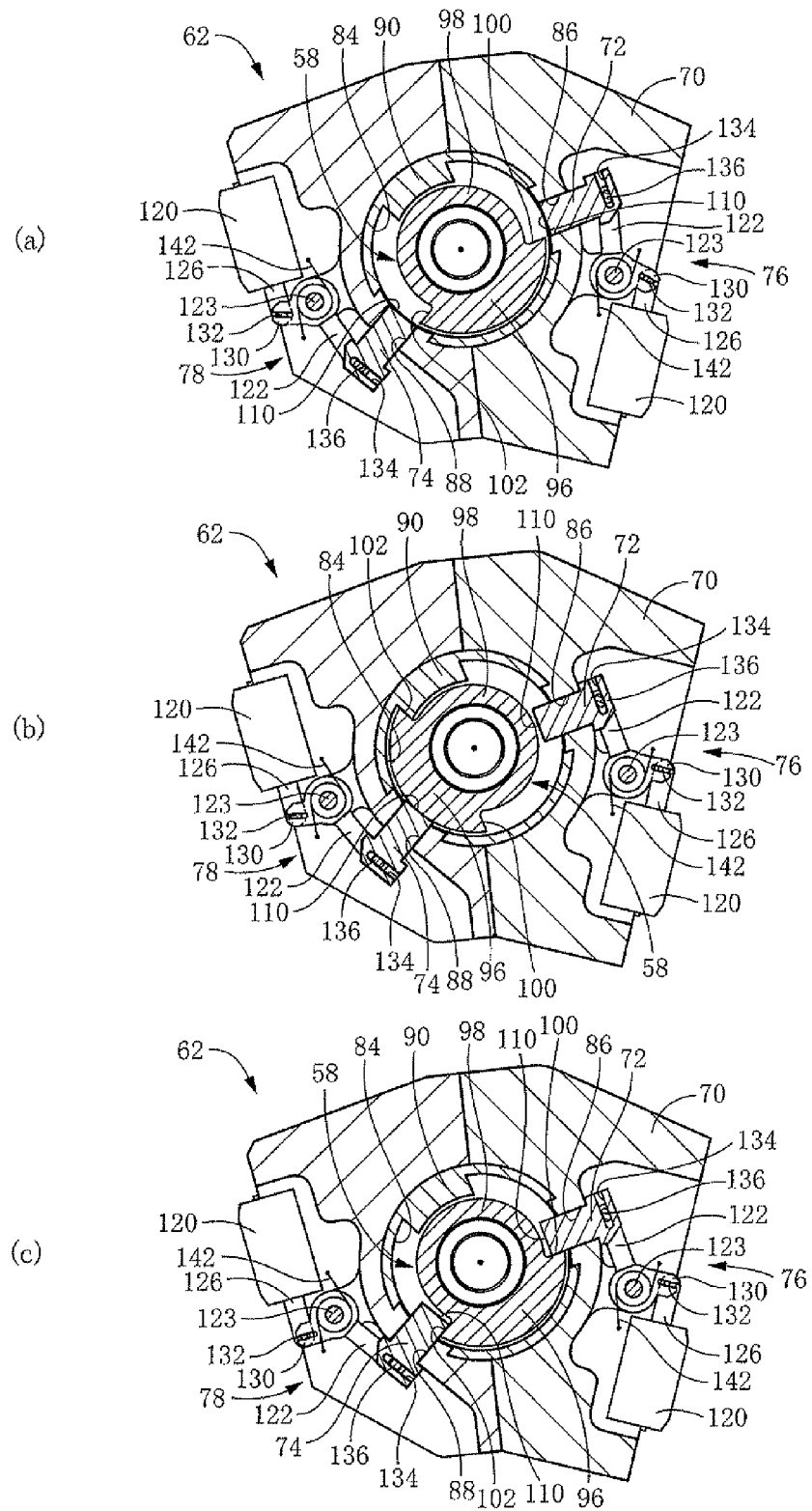
FIG. 8 is a set of views showing operational states of the above-described lean lock device, wherein the view (a) shows an unlocking state of the lean lock device, the view (b) shows a state in which one of locking members in its working position and the view (c) shows a locking state of the lean lock device.

In step 1 (hereinafter referred to as S1 as well as the other steps), it is judged whether the main switch 188 is ON or not. When the main switch 188 is ON, S2 is implemented to judge whether the lean actuator 50 is in a normally operable state or not. When the lean actuator 50 is normally operable, S3 is implemented to cause the solenoids 120 of the lean lock device 62 to be energized whereby the lean lock device 62 is placed in its unlocking state. As shown in FIG. 8 (a), the locking members 72, 74 are held in the respective retracted positions, whereby rotation of the output shaft 58 is allowed.

Subsequently, in S4, the operating amount φ, the running velocity V, the yaw rate γ and other values are detected, and the lean angle θ and the rotational angle of the lean actuator 50 are determined based on these detected values. Then, in S5, the lean motor 52 is controlled such that the determined lean angle θ and rotational angle of the lean actuator 50 are established.

Specifically described, a radius of turning of the vehicle is obtained based on the operating amount φ, running velocity V, yaw rate γ and other values, and a centrifugal force is obtained. During turning of the vehicle, the center of gravity of the vehicle is shifted in a direction away from the center of the turning. However, during the turning of the vehicle, if the vehicle body 16 is tilted in the direction toward the center of the turning, the center of gravity is shifted in the direction toward the center of the turning. Therefore, the center of gravity is located in a position closer to the center of the turning, as compared with a case where the vehicle body 16 is not tilted. Thus, the position of the center of gravity is determined depending on a degree of the turning of the vehicle and a degree of angle of tilt of the vehicle body 16.

Further, where the vehicle body 16 is tilted during turning of the vehicle, the centrifugal force acting on the vehicle, a gravity force and the position of the center of gravity may be taken into account, so that it is possible to obtain a magnitude and a direction of a resultant force composed of the centrifugal force and the gravity force, based on the centrifugal force, the gravity force and the position of the center of gravity. In the present embodiment, the lean angle as an angle of tilt of the vehicle body 16 with respect to the normal line of the road surface is determined such that the resultant force F applied to the seesaw bar 20 is caused to act in a direction indicated by arrow F in FIG. 7 (b). Then, the rotational angle of the lean actuator 50 (i.e., relative angle between the vehicle body 16 and the seesaw bar 20) is determined.

Thus, in the present embodiment, by tilting the vehicle body 16 in the direction toward the center of turning of the vehicle, it is possible to restrain displacement of the center of gravity in the direction away from the center of turning of the vehicle and to make loads applied to the respective left side and right side wheels 10, 12 equal to each other, so that the spin stabilization can be improved.

Further, the front left and right wheels 10, 12 are also tilted. An angle of tilt of each of the wheels 10, 12 is determined depending on the suspension 22 and the lean angle of the vehicle body 16.

The force applied to the seesaw bar 20 is distributed to the left and right wheels 10, 12 so that it is possible to reduce a force applied to the output shaft 58 of the lean actuator 50. Consequently, the lean actuator 50 can be constituted by an actuator whose output is small, whereby the lean actuator 50 can be made compact in size, and consumption of an electric power can be reduced.

Figure 7:
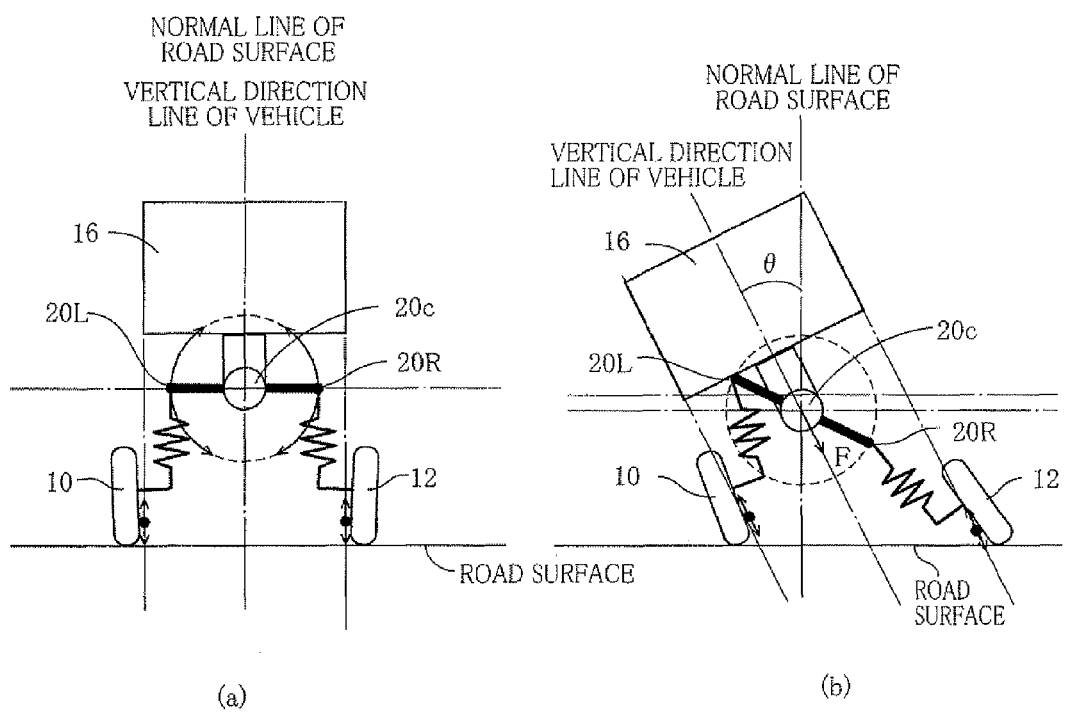
FIG. 7 is a set of views showing change of attitude of a vehicle body which is caused by operation of the above-described vehicle body tilting apparatus, wherein the view (a) shows a state in which the vehicle body is in its neutral position and the view (b) shows a state in which the vehicle body is tilted.

It is noted that, in FIG. 7 (b) (as well as FIG. 9 referred below), the angle of tilt is described to be larger than it actually is, so that the state of the vehicle upon tilt of the vehicle body 16 can be better appreciated.

On the other hand, when the main switch 188 is OFF or when the lean actuator 50 is not normally operable, S6 is implemented to place the lean lock device 62 into its locking state. The solenoids 120 are de-energized whereby the locking members 72, 74 are allowed to be move forward (i.e., moved to the respective working positions). There are a case where each of the solenoids 120 is de-energized by control and also a case where each of the solenoids 120 is de-energized as a result of stop of supply of an electric current thereto due to, for example, failure of an electric system.

When the lean actuator 50 is not normally operable, for example, the solenoids 120 are de-energized so that generations of the forces forcing the locking members 72, 74 to be moved to the respective retracted positions are stopped whereby the locking members 72, 74 are allowed to be moved to the respective working positions, as shown in FIG. 8 (a). If the lean actuator 50 is in the neutral position at a point of time of the de-energizations of the solenoids 120, the locking members 72, 74 are located on respective opposite sides of the large radius portion 96 in the circumferential direction, so that each of the distal end surfaces 110 of the respective locking members 72, 74 is moved forward to a position that is in proximity with the outer circumferential surface of the small radius portion 98, i.e., a position between the outer circumferential surface of the large radius portion 96 and the outer circumferential surface of the small radius portion 98 in the radial direction. Thus, rotation of the output shaft 58 is inhibited.

If the lean actuator 50 is not in the neutral position at the point of time of the de-energizations of the solenoids 120, the locking member 72 as one of the two locking members is moved to the working position while the locking member 74 as the other of the two locking members is inhibited, by the outer circumferential surface of the large radius portion 96, from being moved to the working position, as shown in FIG. 8 (b). Specifically described, the locking member 72, which is located on a side remote from the large radius portion 96 of the output shaft 58, is allowed to be moved forward, while the locking member 74, which is located on the same side as the large radius portion 96, is inhibited from being moved forward. In this state, rotation of the large radius portion 96 in a direction away from the locking member 72 is limited by the stopper 90, while rotation of the large radius portion 96 in a direction toward the locking member 72 is limited by the locking member 72, namely, rotation causing the output shaft 58 to pass the angularly central position is inhibited by the locking member 77. Consequently, the output shaft 58 can be positioned in the angularly central position, and the locking member 74 as well as the locking member 72 is allowed to be moved to the working position, as shown in FIG. 8 (c), whereby rotation of the output shaft 58 is inhibited.

Thus, in the lean lock device 62, the locking members 72, 74 are held in the respective circumferentially opposite sides of the large radius portion 96 of the output shaft 58 that is positioned in the angularly central position, in other words, each of the locking members 72, 74 is held between the stopper 90 and the large radius portion 96 in the circumferential direction, so that rotation of the output shaft 58 can be satisfactorily inhibited by the locking members 72, 74 that are positioned in the respective working positions whereby the output shaft 58 can be locked in the angularly central position.

Embodiment 2

In Embodiment 1, the seesaw bar 20 has a straight linear shape. In the present embodiment, a seesaw bar 200 has a V shape.

Figure 9:
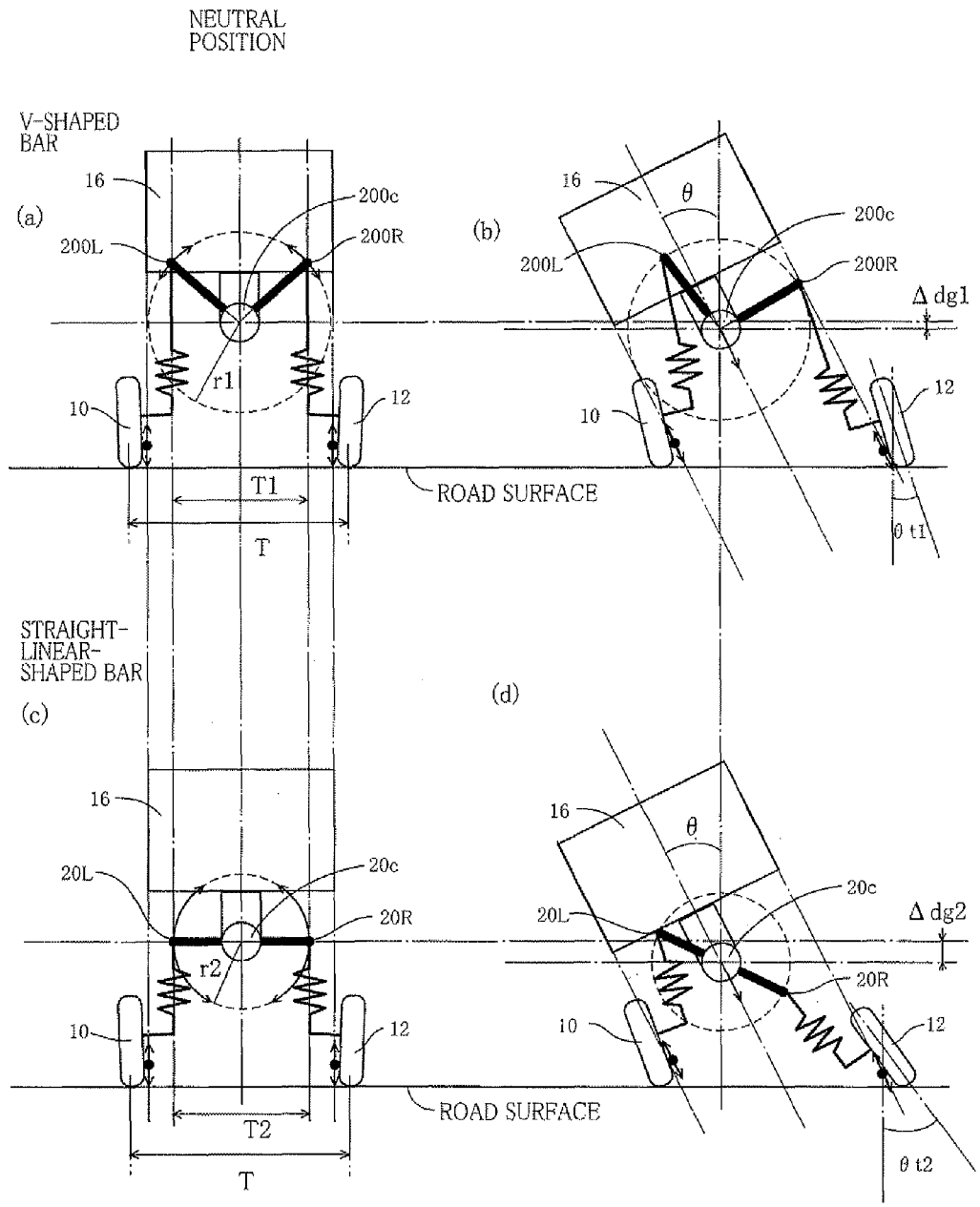
FIG. 9 is a set of views showing change of attitude of a vehicle body which is caused by operation of a vehicle body tilting apparatus according to Embodiment 2 of the present invention, as compared with that is caused by operation of the vehicle body tilting apparatus according to Embodiment 1, wherein the view (a) shows a state in which a body of a vehicle having the vehicle body tilting apparatus of Embodiment 2 is in its neutral position, the view (b) shows a state in which this vehicle body is tilted, the view (c) shows a state in which a body of a vehicle having the vehicle body tilting apparatus of Embodiment 1 is in its neutral position, the view (d) shows a state in which this vehicle body is tilted.
Figure 10:
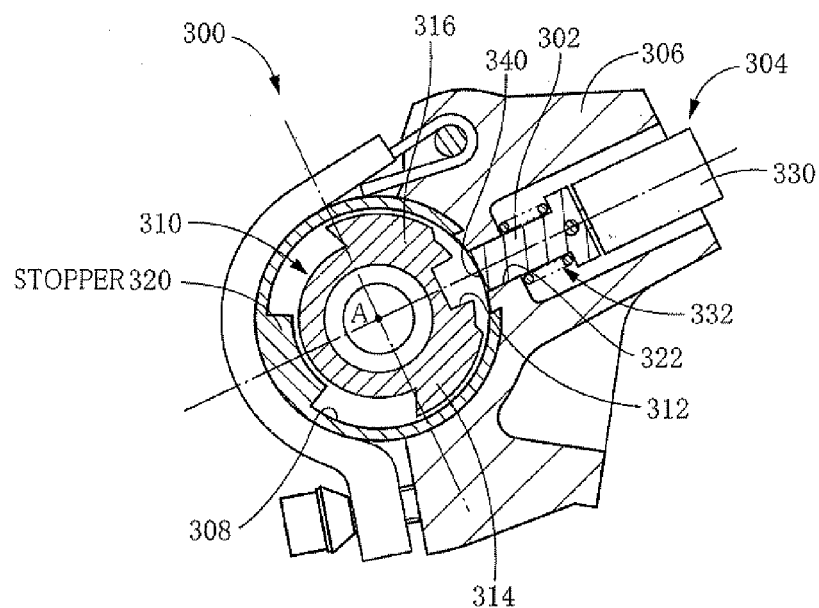
FIG. 10 is a cross sectional view of a lean lock device included in a vehicle body tilting apparatus according to Embodiment 3 of the present invention.

As shown in FIG. 9 (*a*), the seesaw bar 200 is held, at its longitudinal center 200C as a bent portion, by the vehicle body 16, such that the seesaw bar 200 is pivotable relative to the vehicle body 16. The seesaw bar 200 is engaged, at its left-side and right-side end portions 200L, 200R, with the respective struts 32 provided for the respective left and right wheels 10, 12. When the seesaw bar 200 is in the neutral position relative to the vehicle body 16, the left-side and right-side end portions 200L, 200R are located on an upper side of the center 200C.

The vehicle body 16 is tilted, as shown in FIG. 9 (*b*), by controlling the lean actuator 50, whereby the spin stabilization can be improved.

Next, the seesaw bar 200 having the V shape will be described as compared with the seesaw bar 20 having the straight linear shape.

As shown in FIG. 9 (*a*)-(*d*), as long as there is no difference between vehicles (in which the seesaw bars are installed) with respect to a tread T, a distance T1 between the opposite end portions of the seesaw bar 20 as seen from a front side of the vehicle and a distance T2 between the opposite end portions of the seesaw bar 200 as seen from a front side of the vehicle are equal to each other (T1=T2).

However, a length of the seesaw bar 200 having the V shape is larger than that of the seesaw bar 20 having the straight linear shape, so that a pivot radius r1 of the seesaw bar 200 is larger than a pivot radius r2 of the seesaw bar 20 (r1>r2). Further, in a range in which the lean angle is controllable, the end portions 200L, 200R of the seesaw bar 200 are both moved within an upper half of a circle defined by the pivot radius r1, while one and the other of the end portions 20L, 20R of the seesaw bar 20 are moved toward respective upper and lower portions of a circle defined by the pivot radius r2 upon pivot of the seesaw bar 20 from the neutral position. Consequently, where the lean angle θ of the vehicle body 16 is the same, an amount of vertical movement of the opposite end portions of the seesaw bar 200 is smaller than an amount of vertical movement of the opposite end portions of the seesaw bar 20, so that a displacement amount Δdg of the center of gravity (i.e., a change amount of the vehicle height) in the vehicle with the seesaw bar 200 is smaller than that in the vehicle with the seesaw bar 20 (Δdg1<Δdg2). Therefore, by employing the seesaw bar 200, it is possible to more restrain a reduction of ride comfort upon tilt of the vehicle body 16 in a direction toward a center of turning of the vehicle.

Further, since the pivot radius r1 of the seesaw bar 200 is larger than the pivot radius r2 of the seesaw bar 20, an amount of lateral movement of the opposite end portions of the seesaw bar 200 is also smaller than an amount of lateral movement of the opposite end portions of the seesaw bar 20. Therefore, by employing the seesaw bar 200, a amount of change of a camber angle θt of the wheel as a result of tilt of the vehicle body 16 is made smaller whereby the camber angle θt after the tilt is smaller (θt1<θt2) so that it is possible to more satisfactorily restrain an excessive increase of the camber angle of an outside wheel upon turning of the vehicle.

An excessive increase of the camber angle is not preferable, because the camber angle should be within a range that is determined suitably in relation with a tire. However, by employing the seesaw bar 200, it is possible to avoid an excessive increase of the camber angle and to make the camber angle be a suitable degree.

Embodiment 3

It is noted that the construction of the lean lock device is not particularly limited.

In the present embodiment, there is provided a lean lock device 300 that includes a single locking member 302 and a single lean lock actuator 304. A through-hole 308 is provided in a housing 306, and extends in a direction of the axis A. In the through-hole 308, an output shaft 310 of the lean actuator 50 is disposed. The output shaft 310 has an outer peripheral portion in which a single recess 312 and large radius portions 314, 316 are provided. The recess 312 serves as a fitting hole in which the locking member 302 is to be fitted. The large radius portions 314, 316 are located on respective circumferentially opposite sides of the recess 312. By contact of each of the large radius portions 314, 316 with a stopper 320, rotation of the output shaft 310 is limited. In the present embodiment, the output shaft 310 is rotatable from its angularly central position by a degree that is not larger than 90°. A fitting hole 322 is provided in the housing 306, and extends in a radial direction so as to communicates with the through-hole 308. The locking member 302 is slidably fitted in the fitting hole 322. The fitting hole 322 is located in a position that is opposed to the recess 312 when the output shaft 310 is in the angularly central position. The large radius portions 314, 316 of the output shaft 310 are provided in respective positions, such that one of the large radius portions 314, 316 closes the fitting hole 322 when the other of the large radius portions 314, 316 is in contact with the stopper 320. The locking member 302 is allowed to be moved to the working position when the locking member 302 is located between the pair of large radius portions 314, 316.

Meanwhile, the lean lock actuator 304 includes a solenoid 330 and a spring 332. The locking member 302 is engaged at its rear end portion with an output rod of the solenoid 330, such that the locking member 302 and the output rod of the solenoid 330 are axially unmovable relative to each other (but are allowed to be slightly pivoted relative to each other). The spring 332 is a tension spring, and is adapted to bias the locking member 302 in the forward direction.

When the solenoid 330 is energized, the locking member 302 is moved to its retracted position and held in the retracted position whereby a distal end 340 of the locking member 302 is positioned outside the through-hole 308.

When the solenoid 330 is de-energized, the locking member 302 is allowed to be moved to its working position. When the locking member 302 is opposed to the recess 312 upon de-energization of the solenoid 330, the locking member 312 is fitted into the recess 312 whereby rotation of the output shaft 310 is inhibited.

Embodiment 4

Figure 11:
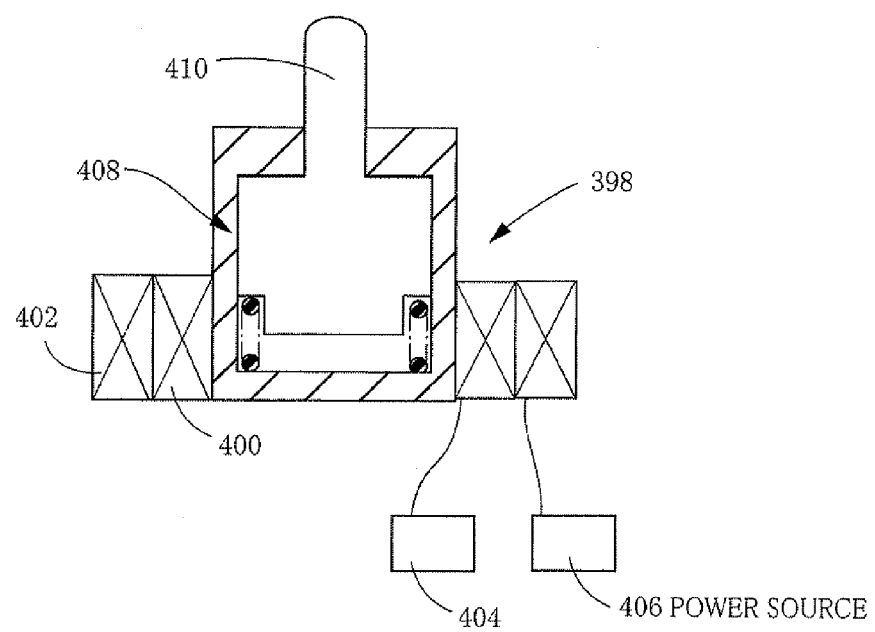
FIG. 11 is a view schematically showing periphery of a solenoid of a lean lock device included in a vehicle body tilting apparatus according to Embodiment 4 of the present invention.

The solenoid may include a plurality of coils, as shown in FIG. 11 by way of example. In the example of FIG. 11, a solenoid 398 includes two coils 400, 402 that are connected to respective electric power sources 404, 406. That is, there are provided two sets of coils and electric power sources. The two coils 400, 402 are disposed such that electromagnetic driving forces generated by the respective coils 400, 402 are caused to act in the same direction upon supply of electric current to the coils 400, 402. A plunger 408 can be operated by at least one of the two coils 400, 402. An output rod 410 is constituted by a distal end portion of the plunger 408, and is engaged with the driving-force transmitting member 122 described above in Embodiment 1 or the locking member 302 described above in Embodiment 3.

Owing to the provision of the two sets of coils and electric power sources are provided, the locking member can be held in its retracted position, even in the event of disconnection of either one of the two coils 400, 402, or even in the event of failure of either one of the two electric power sources 404, 406 which disables supply of the electric current to a corresponding one of the two coils 400, 402. Consequently, it is possible to satisfactorily avoid a situation that the lean actuator 50 is locked due to failure of the lean lock actuator although the lean actuator 50 is normally operable.

It is noted that three or more coils may be provided.

Further, the plurality of coils may be disposed in either parallel or series with each other, as long as the locking member is operable equally by either one of the plurality of coils.

The provision of a plurality of sets of coils and electric power sources is not essential. It is possible to employ an arrangement in which a plurality of electric power sources are connected to a single coil or an arrangement in which a single electric power source is connect to a plurality of coils. In either of these arrangements, the reliability of the lean lock device can be further improved as compared with an arrangement with provision of a single set of coil and electric power source.

The lean actuator 50 may be controlled in a manner that is not particularly limited to details in the above-described embodiments. It is not essential that the lean actuator 50 is controlled in such a manner that causes loads applied to the respective left side and right side wheels 10, 12, to be equal to each other. The lean actuator 50 may be controlled such that the resultant force acts along a line that passes through a desired region.

In the above-described embodiments, the lean lock actuators 50, 304 include the solenoids 210 or solenoid 330. However, the lean lock actuator may be adapted to include a cylinder, an electric motor or the like.

Further, the seesaw bar may have a shape that is not particularly limited. The seesaw bar may have a U shape.

Moreover, the provision of the lean lock device is not essential. Still further, the lean lock device may be used in combination with a lean actuator that is other than the above-described lean actuator 50. That is, the present invention can be carried out in not only the above-described modes but also in other modes of various modifications and improvements that will be made based on knowledge of a person skilled in the art.

DESCRIPTION OF REFERENCE SIGNS

10, 12: wheels 16: vehicle body 20: seesaw bar 30: leading arm 32: strut 50: lean actuator 52: lean motor 58: output shaft 60: housing 62: lean lock device 72, 74: locking member 76, 78: lean lock actuator 90: stopper 96: large radius portion 98: small radius portion 120: solenoid 122: driving-force transmitting member 142: spring 300: lean lock device 302: locking member 304: lean lock actuator 310: output shaft 312: recess 330: solenoid 332: spring

The invention claimed is:

1. A vehicle body tilting apparatus characterized by comprising:
    a right/left-wheels holding member having an elongated shape, and holding a right side wheel and a left side wheel of a vehicle which are disposed to be spaced apart from each other in a width direction of the vehicle such that each of the wheels is movable in a vertical direction; and
    a lean actuator disposed between said right/left-wheels holding member and a body of the vehicle, and configured to tilt at least the body of the vehicle in a lateral direction with respect to a normal line that is perpendicular to a road surface, by pivoting said right/left-wheels holding member and the body of the vehicle relative to each other,
    wherein an output shaft of said lean actuator is fixed to said right/left-wheels holding member, and the body of the vehicle is fixed to a main body of said lean actuator,
    wherein the left side wheel and the right side wheel are held by said right/left-wheels holding member through respective struts,
    wherein said right/left-wheels holding member has a shape that is curved as seen from a front side of the vehicle, said right/left-wheels holding member including engaged portions at which said right/left-wheels holding member is engaged with the struts for the left side wheel and the right side wheel, said right/left-wheels holding member including a fixed portion at which said right/left-wheels holding member is fixed to said output shaft of said lean actuator,
    and wherein right/left-wheels holding member is provided to take an attitude that causes said engaged portions to be positioned on an upper side of said fixed portion when said right/left-wheels holding member is in a neutral pivot position relative to the body of the vehicle.

2. The vehicle body tilting apparatus according to claim 1, wherein the left side wheel and the right side wheel are held by the body of the vehicle through respective leading arms.

3. The vehicle body tilting apparatus according to claim 1, comprising a lean lock device that is configured, when said lean actuator fails to be operated normally, to lock said lean actuator in a neutral position thereof.

4. The vehicle body tilting apparatus according to claim 3, wherein said output shaft is rotatable by an angle not larger than 180° in either of opposite directions from an angularly central position thereof corresponding to the neutral position,
    and wherein said lean lock device includes a rotation locking portion that is configured to lock said output shaft in the angularly central position corresponding to the neutral position.

5. The vehicle body tilting apparatus according to claim 3, wherein said lean lock device includes (a) at least one locking member that is movable between a retracted position and a working positions thereof, (b) a biasing member that biases said at least one locking member in a direction toward the working position, and (c) a lean lock actuator which is configured to cause said at least one locking member to be held in the retracted position against a biasing force of said biasing member when said lean actuator is operable normally, and which is configured to allow said at least one locking member to be moved to the working position when said lean actuator fails to be operated normally.

6. The vehicle body tilting apparatus according to claim 5,
    wherein said output shaft has a large radius portion and a small radius portion which have respective different radii and which are arranged in a circumferential direction of said output shaft,
    and wherein said lean lock device includes two locking members, such that said two locking members are movably held in respective portions of a housing which are located in respective opposite sides of the large radius portion in the circumferential direction when said output shaft is in an angularly central position corresponding to the neutral position.

7. The vehicle body tilting apparatus according to claim 5, wherein said output shaft has a recess that is provided in an outer peripheral portion thereof, and wherein said lean lock device includes a locking member, such that said locking member is movably held in a portion of a housing which enables said locking member to be fitted into said recess when said output shaft is in an angularly central position corresponding to the neutral position.

8. The vehicle body tilting apparatus according to claim 5, wherein said lean lock actuator includes a solenoid that is configured to give a driving force to said at least one locking member.

9. A vehicle body tilting apparatus comprising:
a right/left-wheels holding member having an elongated shape, and holding a right side wheel and a left side wheel of a vehicle which are disposed to be spaced apart from each other in a width direction of the vehicle such that each of the wheels is movable in a vertical direction; and
a lean actuator disposed between said right/left-wheels holding member and a body of the vehicle, and configured to tilt at least the body of the vehicle in a lateral direction with respect to a normal line that is perpendicular to a road surface, by pivoting said right/left-wheels holding member and the body of the vehicle relative to each other,
wherein an output shaft of said lean actuator is fixed to said right/left-wheels holding member, and the body of the vehicle is fixed to a main body of said lean actuator,
said vehicle body tilting apparatus comprising a lean lock device that is configured, when said lean actuator fails to be operated normally, to lock said lean actuator in a neutral position thereof,
wherein said lean lock device includes (a) at least one locking member that is movable between a retracted position and a working positions thereof, (b) a biasing member that biases said at least one locking member in a direction toward the working position, and (c) a lean lock actuator which is configured to cause said at least one locking member to be held in the retracted position against a biasing force of said biasing member when said lean actuator is operable normally, and which is configured to allow said at least one locking member to be moved to the working position when said lean actuator fails to be operated normally.

10. The vehicle body tilting apparatus according to claim 9 wherein said right/left-wheels holding member is a right/left-wheels holding bar that extends straight in the width direction of the vehicle.

11. The vehicle body tilting apparatus according to claim 9,
wherein the left side wheel and the right side wheel are held by said right/left-wheels holding member through respective struts,
wherein said right/left-wheels holding member has a shape that is curved as seen from a front side of the vehicle, said right/left-wheels holding member including engaged portions at which said right/left-wheels holding member is engaged with the struts for the left side wheel and the right side wheel, said right/left-wheels holding member including a fixed portion at which said right/left-wheels holding member is fixed to said output shaft of said lean actuator,
and wherein right/left-wheels holding member is provided to take an attitude that causes said engaged portions to be positioned on an upper side of said fixed portion when said right/left-wheels holding member is in a neutral pivot position relative to the body of the vehicle.

* * * * *